US008918558B2

(12) United States Patent
Heaslip

(10) Patent No.: US 8,918,558 B2
(45) Date of Patent: Dec. 23, 2014

(54) ROUND ROBIN PRIORITY SELECTOR

(75) Inventor: Jay G. Heaslip, Williston, VT (US)

(73) Assignee: International Business Machines Corporation, Armonk, NY (US)

(*) Notice: Subject to any disclaimer, the term of this patent is extended or adjusted under 35 U.S.C. 154(b) by 570 days.

(21) Appl. No.: 13/246,911

(22) Filed: Sep. 28, 2011

(65) Prior Publication Data

US 2013/0080743 A1 Mar. 28, 2013

(51) Int. Cl.
*G06F 3/00* (2006.01)
*G06F 5/00* (2006.01)
*G06F 13/00* (2006.01)
*G06F 13/14* (2006.01)
*G06F 13/36* (2006.01)
*G06F 13/37* (2006.01)

(52) U.S. Cl.
CPC ................ *G06F 13/14* (2013.01); *G06F 13/37* (2013.01); *G06F 13/36* (2013.01)
USPC ............................................ 710/42; 710/111

(58) Field of Classification Search
CPC .......... G06F 13/14; G06F 13/36; G06F 13/37
USPC .................................................... 710/111, 42
See application file for complete search history.

(56) References Cited

U.S. PATENT DOCUMENTS 5,367,679 A * 11/1994 Khaira .......................... 718/103
5,832,278 A 11/1998 Pham
6,678,774 B2 * 1/2004 Providenza ................... 710/240
6,807,187 B1 10/2004 Sagi
6,853,640 B1 2/2005 Hayashi et al.
6,954,812 B2 * 10/2005 Lavigne ........................ 710/243
7,051,133 B2 * 5/2006 Takata .......................... 710/111
7,150,021 B1 * 12/2006 Vajjhala et al. ............... 718/104
7,222,204 B2 5/2007 Athanassiadis
7,236,499 B2 6/2007 Kurupati
7,631,130 B2 12/2009 Jensen
7,657,883 B2 2/2010 Jensen
7,681,014 B2 * 3/2010 Jensen et al. .................. 712/214

(Continued)

FOREIGN PATENT DOCUMENTS

JP 2003271545 9/2003
WO 2010096635 8/2010

OTHER PUBLICATIONS

Intellectual Property Office Combined Search Report, GB Application No. GB1215846.5, dated Dec. 21, 2012, pp. 1-6.

*Primary Examiner* — Eric Oberly
(74) *Attorney, Agent, or Firm* — Gibb & Riley, LLC; Michael J. LeStrange, Esq.

(57) ABSTRACT

Method and structures for performing round robin priority selection receive an input vector into an input port. The methods and structures group the bits of the input vector into groups of bits and supply the groups of bits to round robin priority selectors. Then, the methods and structures simultaneously identify an individual group priority bit within each group of bits based on the starting bit location, using the round robin priority selectors. The methods and structures also choose, using the group selector, a round robin priority selector based on the starting bit location. The methods and structures then output, from the group selector to a multiplexor, the individual group priority bit of the selected round robin priority selector. Following this the method outputs, from the multiplexor, an output vector having a first value (e.g., 1) only in the individual group priority bit output by the group selector.

20 Claims, 8 Drawing Sheets

(56) References Cited

U.S. PATENT DOCUMENTS

| | | | | |
|---|---|---|---|---|
| 7,773,621 | B2 | 8/2010 | Jensen | |
| 7,870,320 | B1 | 1/2011 | Purdham et al. | |
| 8,078,840 | B2 * | 12/2011 | Banerjee et al. | 712/205 |
| 2004/0179535 | A1 * | 9/2004 | Bertagna | 370/395.21 |
| 2008/0069129 | A1 | 3/2008 | Jensen et al. | |

* cited by examiner

ROUND ROBIN PRIORITY SELECTOR

BACKGROUND

The present disclosure relates to round robin priority selectors, and more specifically, to a priority selector that includes multiple priority selectors operatively connected in parallel, where each of the priority selectors simultaneously identifies an individual group priority bit within each group of bits.

Round robin priority selectors are used for many different applications to arbitrate among different requests for a limited resource. For example, round robin priority selectors are often used in a multi-port switch, a disk controller arbitrating requests, dispatch schedulers in a multithreading processor, or any other situation where competing resources are accessed using a round-robin type of methodology.

For example, because there are multiple threads in a multithreading processor, a round robin priority selector is needed as a dispatch scheduler to schedule requests competing for limited resources. Similarly, a disk controller can use a priority selector to arbitrate upon competing demands as requests are buffered. Switches can use a priority selector to arbitrate among transmission requests. In a multi-port switch, each of the ports of the switch receives transactions from the device coupled to the port, and the switch routes the transactions from the source port to a destination port.

SUMMARY

An exemplary priority selector embodiment herein comprises an input port that receives an input vector. The input vector comprises bits and a pointer specifying a starting bit location. Priority selectors are operatively connected in parallel to the input port. Each of the priority selectors simultaneously identifies an individual group priority bit within each group of bits based on the starting bit location. Also, a group selector is operatively connected to the priority selectors. The group selector chooses a priority selector based on the starting bit location, and the group selector outputs the individual group priority bit from the selected priority selector. A multiplexor is also operatively connected to the group selector. The multiplexor outputs an output vector that has a first value (e.g., 1) only in the individual group priority bit output by the group selector, and all other bits of the output vector have a second value (e.g., 0).

Another embodiment herein comprises a round robin priority selector that also has an input port that receives the input vector. Again, the input vector comprises bits and a pointer specifying a starting bit location. Further, a splitter is operatively connected to the input port, and the splitter groups the bits into groups of bits. A plurality of round robin priority selectors are operatively connected in parallel to the splitter. Each of the round robin priority selectors simultaneously identifies an individual group priority bit within each group of bits based on the starting bit location. A group selector is operatively connected to the round robin priority selectors. The group selector chooses a round robin priority selector based on the starting bit location. Then, the group selector outputs the individual group priority bit from the selected round robin priority selector. Further, a multiplexor is operatively connected to the group selector. The multiplexor outputs an output vector having a first value (e.g., 1) only in the individual group priority bit output by the group selector, and all other bits of the output vector have a second value (e.g., 0).

A method of performing round robin priority selection herein receives, into an input port, the input vector. The method also groups the bits into groups of bits using the splitter and supplies the groups of bits to the round robin priority selectors. Then, the method simultaneously identifies an individual group priority bit within each group of bits based on the starting bit location, using the round robin priority selectors. The method also chooses, using the group selector, a round robin priority selector based on the starting bit location. The method then outputs, from the group selector to the multiplexor, the individual group priority bit of the selected round robin priority selector. Following this the method outputs, from the multiplexor, an output vector having a first value (e.g., 1) only in the individual group priority bit output by the group selector, and all other bits of the output vector have a second value (e.g., 0).

A non-transitory computer readable storage medium embodiment herein is readable by a computerized device. The non-transitory computer readable storage medium stores instructions executable by the computerized device to perform a method of performing round robin priority selection. The method receives the input vector, groups the bits into groups of bits, simultaneously identifies the individual group priority bit within each group of bits based on the starting bit location, chooses a selected group of bits based on the starting bit location, and outputs an output vector that has a first value (e.g., 1) only in the individual group priority bit of the selected group of bits, and all other bits of the vector have a second value (e.g., 0).

BRIEF DESCRIPTION OF THE DRAWINGS

The embodiments herein will be better understood from the following detailed description with reference to the drawings, which are not necessarily drawing to scale and in which.

DETAILED DESCRIPTION

Figure 1:
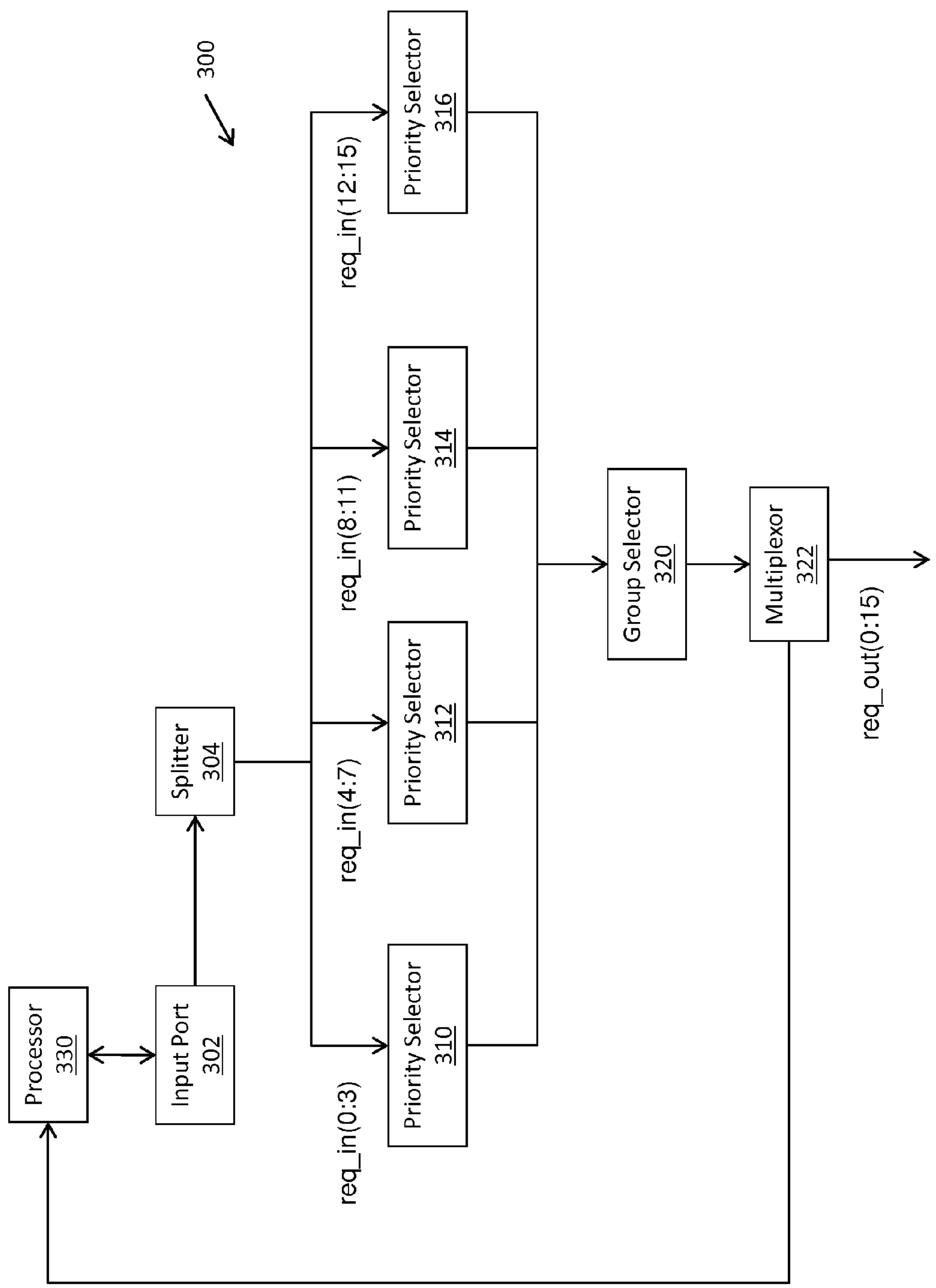
FIG. 1 is a schematic diagram of a priority selector according to embodiments herein.

As mentioned above, round robin priority selectors are used for many different applications to arbitrate among many requests for a limited resource. With reference now to FIG. 1, an exemplary embodiment herein comprises a priority selector 300, such as a round robin priority selector. The selector 300 has an input port 302 that receives the input vector. The input vector comprises bits and a pointer specifying a starting bit location. Each of the bits represents an individual requestor for a limited resource, and more than one bit in the input vector can have a value indicating a request for that resource. For example the value "1" can represent a request, while the value "0" can represent a non-request (and such values are sometimes referred to herein as "first" and "second" values, for convenience).

Further, a splitter 304 is operatively connected to the input port 302. The splitter 304 slices the input vector into slices by grouping the bits into groups of bits. Also, multiple round robin priority selectors 310, 312, 314, 316 are operatively connected in parallel to the splitter 304. The splitter 304 can be a physical device or can represent a slicing operation performed by either the input port 302 or the priority selectors 310, 312, 314, 316. Each of the round robin priority selectors 310, 312, 314, 316 simultaneously identifies an individual group priority bit within each group of bits based on the starting bit location.

Therefore, as shown in the 16-bit example in FIG. 1, priority selector 310 processes bits 0-3; at the same time priority selector 312 processes bits 4-7; at the same time priority selector 314 processes bits 8-11; and at the same time priority selector 316 processes bits 12-15. Those ordinarily skilled in the art would understand that the selector 300 could have more or less priority selectors, to handle input vectors with greater numbers or lesser numbers of bits, and that each priority selectors could process more bits or less bits.

When processing the bits, each priority selector (simultaneously with all other priority selectors) notes the position of the pointer. If the pointer is pointing to a bit number higher than the highest bit number within a priority selector, the priority selector does not select an individual group priority bit. For example, if the pointer was pointing to bit 9, priority selectors 310 and 312 would not select an individual group priority bit because they are only processing bits 0-8.

However, if the pointer is pointing to a bit number lower than the lowest bit number within a priority selector, that priority selector selects the first bit number (in bit order) that has a "1" (or other "request" value (first value)) as its individual group priority bit. Therefore, again if the pointer was pointing to bit 9, priority selector 316 would begin at bit 12 and work up toward bit 15 until a "1" is located (first value is located). If bit 12 had a "0" and bit 13 had a "1" (and the pointer is pointing to bit 9) priority selector 316 would select bit 13 as its individual group priority bit.

On the other hand, if the pointer is pointing to a bit number within a given priority selector, that priority selector selects the bit number pointed to by the pointer as its individual group priority bit, unless that bit has a non-request value (second value ("0")) and, in that situation, that priority selector selects the first bit number (in bit order above the bit being pointed to) that has a "request" value as its individual group priority bit. Thus, continuing with the previous example of the pointer pointing to bit 9, priority selector 314 would first look to bit 9 to see if it has the first value ("1"). If bit 9 has the first value, priority selector 314 would select bit 9 as its individual group priority bit. However, if bit 9 is the second value ("0") priority selector 314 would begin at bit 9 and work up toward bit 11 until a "1" is located.

If none of the bits (that are available to become the individual group priority bit as controlled by the pointer) have a "request" value (e.g., "1") then the priority selector does not select an individual group priority bit. Therefore, again using the example of the pointer pointing to bit 9, if bits 9-11 are all "0" priority selector 314 would not select an individual group priority bit. Similarly, in the same example of the pointer pointing to bit 9, if bits 12-15 are all "0" priority selector 316 would not select an individual group priority bit.

By having each priority selector perform the same processing on a smaller number of bits simultaneously, the time needed to perform such bit selection is substantially reduced when compared to a single 16-bit priority selector performing the same operations.

A group selector 320 is operatively connected to the round robin priority selectors 310, 312, 314, 316. The group selector 320 chooses a round robin priority selector based on the starting bit location. More specifically, the group selector 320 chooses the "selected" round robin priority selector based on the pointer pointing to the individual group priority bit within the selected round robin priority selector. In the example above of the pointer pointing to bit 9, the group selector 320 would select priority selector 314 as the selected round robin priority selector because priority selector 314 contains bit 9. However, if the first "selected" priority selector has not selected an individual group priority bit, the group selector 320 selects the next priority selector (in bit order) that has selected an individual group priority bit. Thus, if priority selector 314 has not selected an individual group priority bit, group selector 320 would select priority selector 316 (assuming that priority selector 316 has selected an individual group priority bit).

Then, the group selector 320 outputs the individual group priority bit from the selected round robin priority selector to a multiplexor 322 that is operatively connected to the group selector 320. The multiplexor 322 outputs a full length output vector (in this example, a 16-bit output vector) that has a first value (e.g., "1") only in the individual group priority bit output by the group selector 320, and all other bits of the output vector have a second value (e.g., "0"). Thus, continuing with the above example of the pointer pointing to bit 9, if bit 9 was "0" but bit 10 was "1," priority selector 314 would select bit 10 as its individual group priority bit. In turn, group selector 320 would select priority selector 314 as the selected priority selector. Using this information, the multiplexor would output a 16-bit output vector with all "0's" except bit 10, which would be a "1."

Further, a processor 330 is operatively connected to the multiplexor 322, and the processor 330 updates the position of the pointer to the next bit following the individual group priority bit from the selected round robin priority selector. In the foregoing example, since bit 10 was the priority bit from the selected round robin priority selector, the pointer would be updated to point to bit 11 as the new starting bit. Then, the input port 302 receives the input vector at least one additional time for additional processing after the pointer has been updated to the next bit (until there are no more bits to process).

Figure 2:
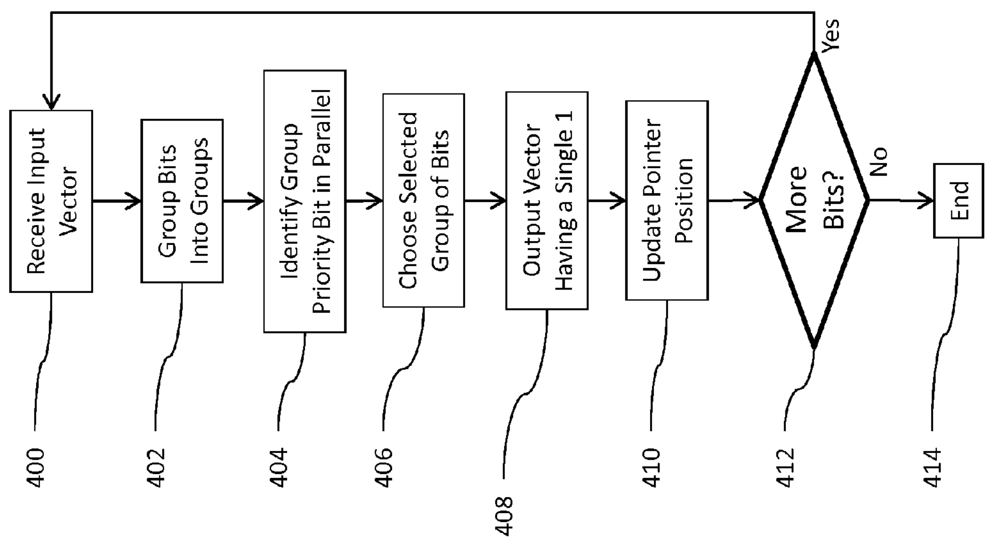
FIG. 2 is a flow diagram illustrating method embodiments herein.

FIG. 2 is a flow diagram illustrating exemplary method embodiments that perform round robin priority selection in, for example: a multi-port switch; a disk controller arbitrating requests; dispatch schedulers in a multithreading processor; multi-channel switches or any other situation where competing resources are accessed using a round-robin type of methodology. The methods discussed herein can be embodied as software/firmware upgrades to any such conventional priority selector. More specifically, as shown in item 400, the method receives the input vector, and in item 402, this exemplary method groups the bits into groups. As shown in item 404, the method simultaneously identifies the individual group priority bit within each group of bits based on the starting bit location.

Next, it item 406, this method chooses a selected group of bits based on the starting bit location. This method outputs an output vector that has a first value (e.g., 1) only in the individual group priority bit of the selected group of bits, and all other bits of the vector have a second value (e.g., 0) in item 408. In item 410, the method updates the position of the pointer to the next bit following the individual group priority bit from the selected round robin priority selector. Item 412 determines if there are any more bits to process. If there are, processing returns to item 400 where the method receives the input vector at least one additional time for additional processing after the pointer has been updated to the next bit. If there are no additional bits to process, the method terminates at item 414.

Thus, as shown above, by having each of the multiple priority selectors perform the same processing on a smaller number of bits simultaneously, the time needed to perform such bit selection is substantially reduced when compared to a single larger priority selector performing the same operations.

As will be appreciated by one skilled in the art, aspects herein may be embodied as a system, method or computer program product. Accordingly, aspects herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects herein are described below with reference to flowchart illustrations and/or block diagrams of methods, apparatus (systems) and computer program products according to embodiments herein. It will be understood that each block of the flowchart illustrations and/or 2-D block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
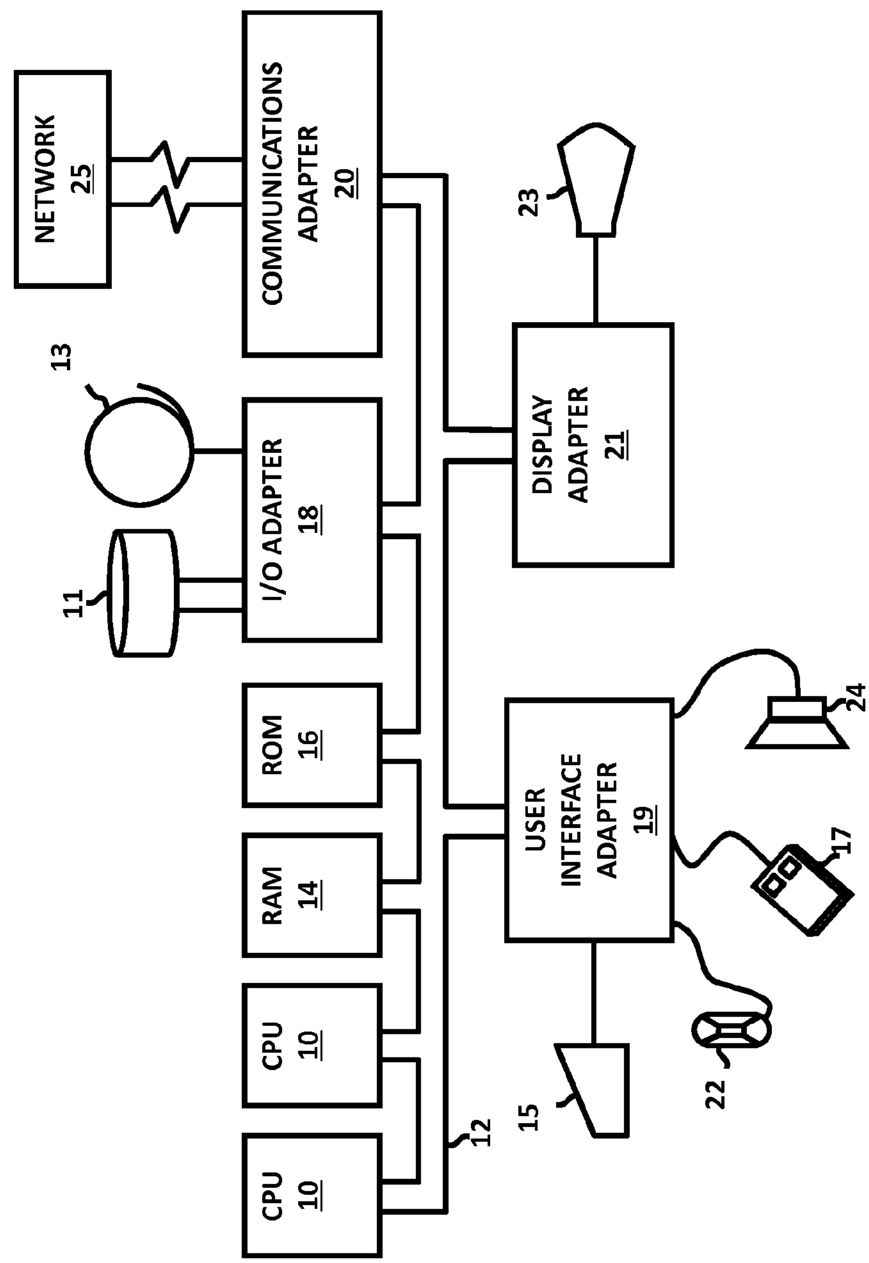
FIG. 3 is a schematic diagram of a hardware system according to embodiments herein.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 4:
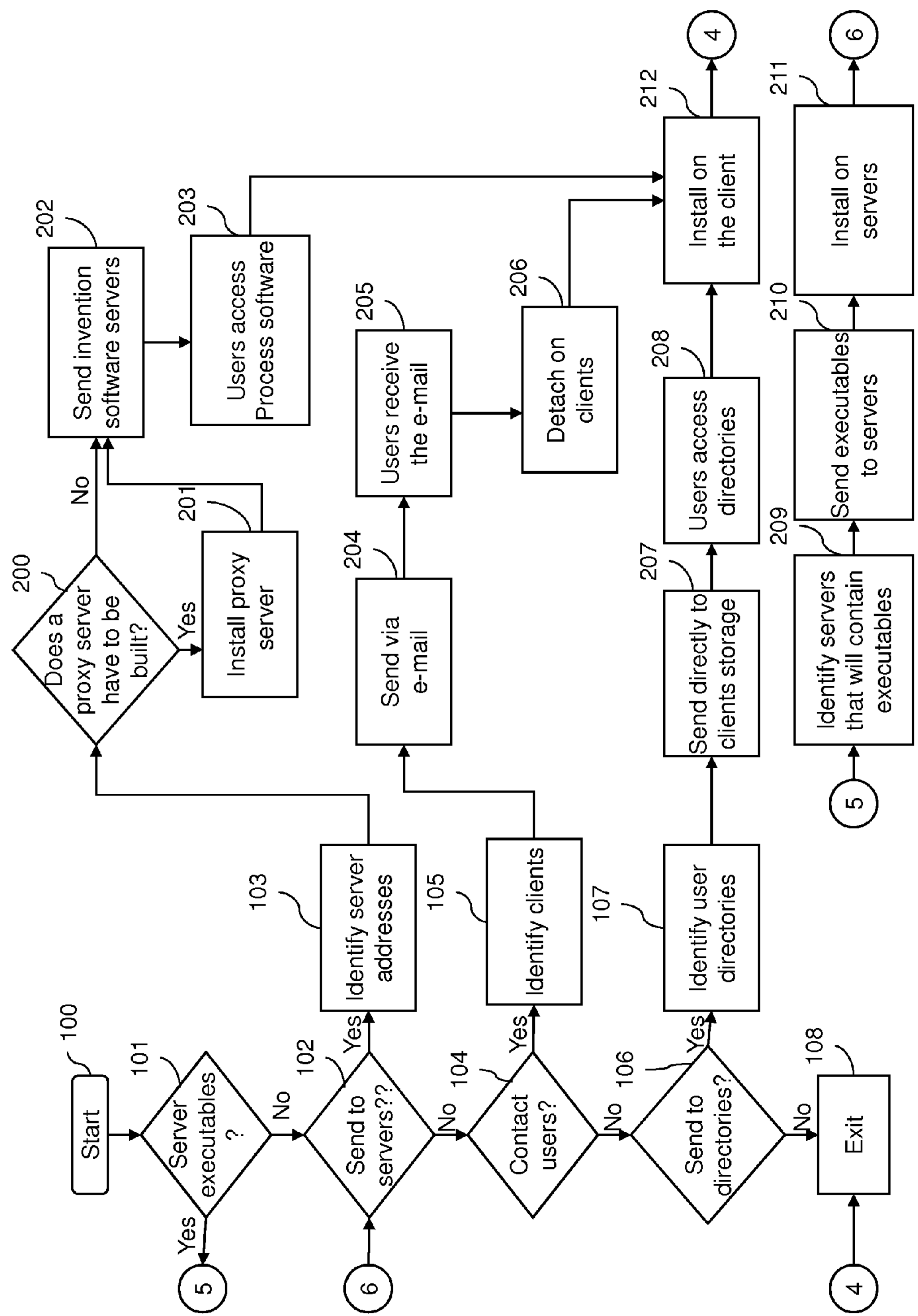
FIG. 4 is a schematic diagram of a deployment system according to embodiments herein.

As shown in FIG. 4, step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying through the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software.

Conversely, parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 5:
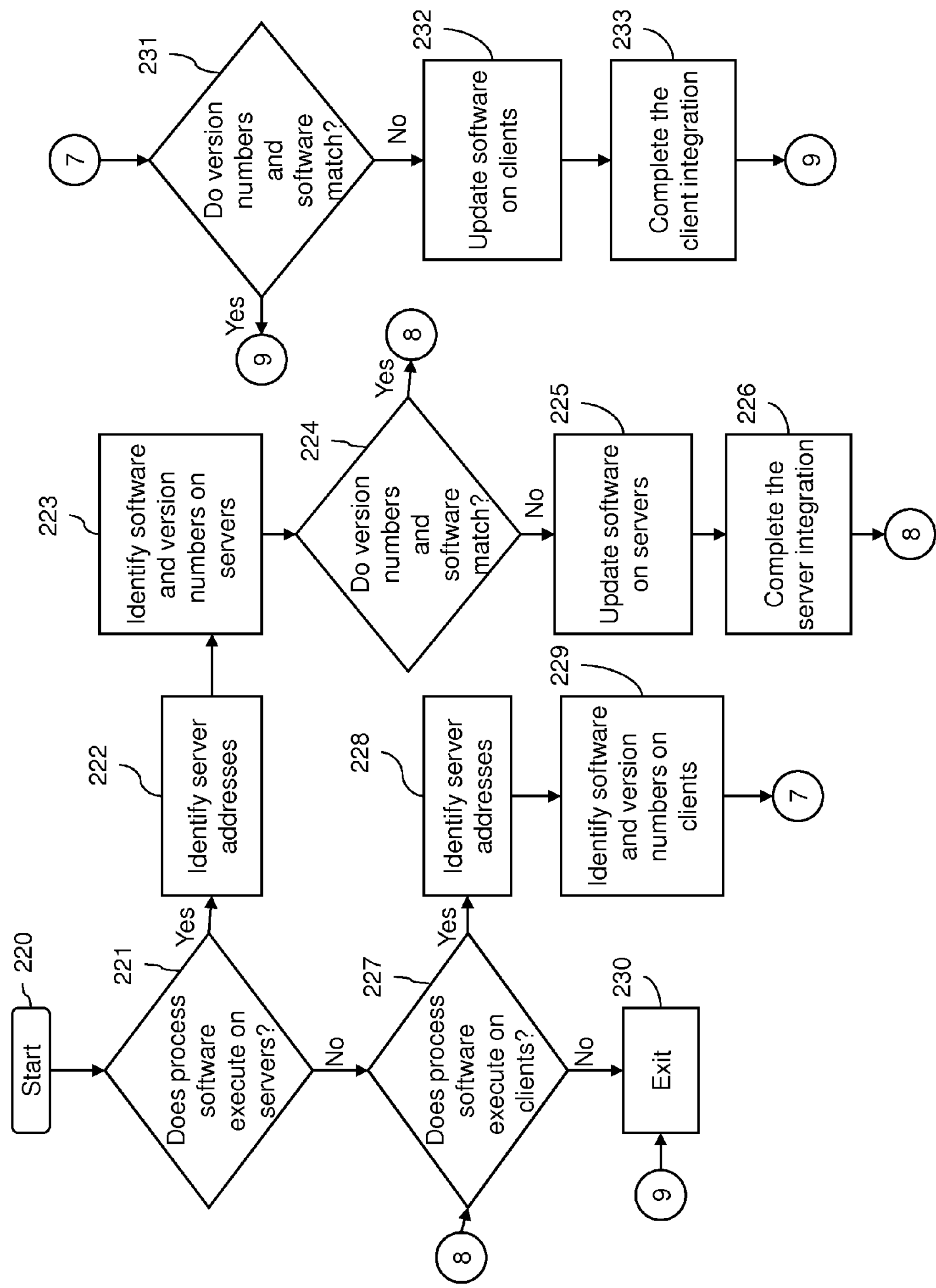
FIG. 5 is a schematic diagram of an integration system according to embodiments herein.

As shown in FIG. 5, step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software, the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6:
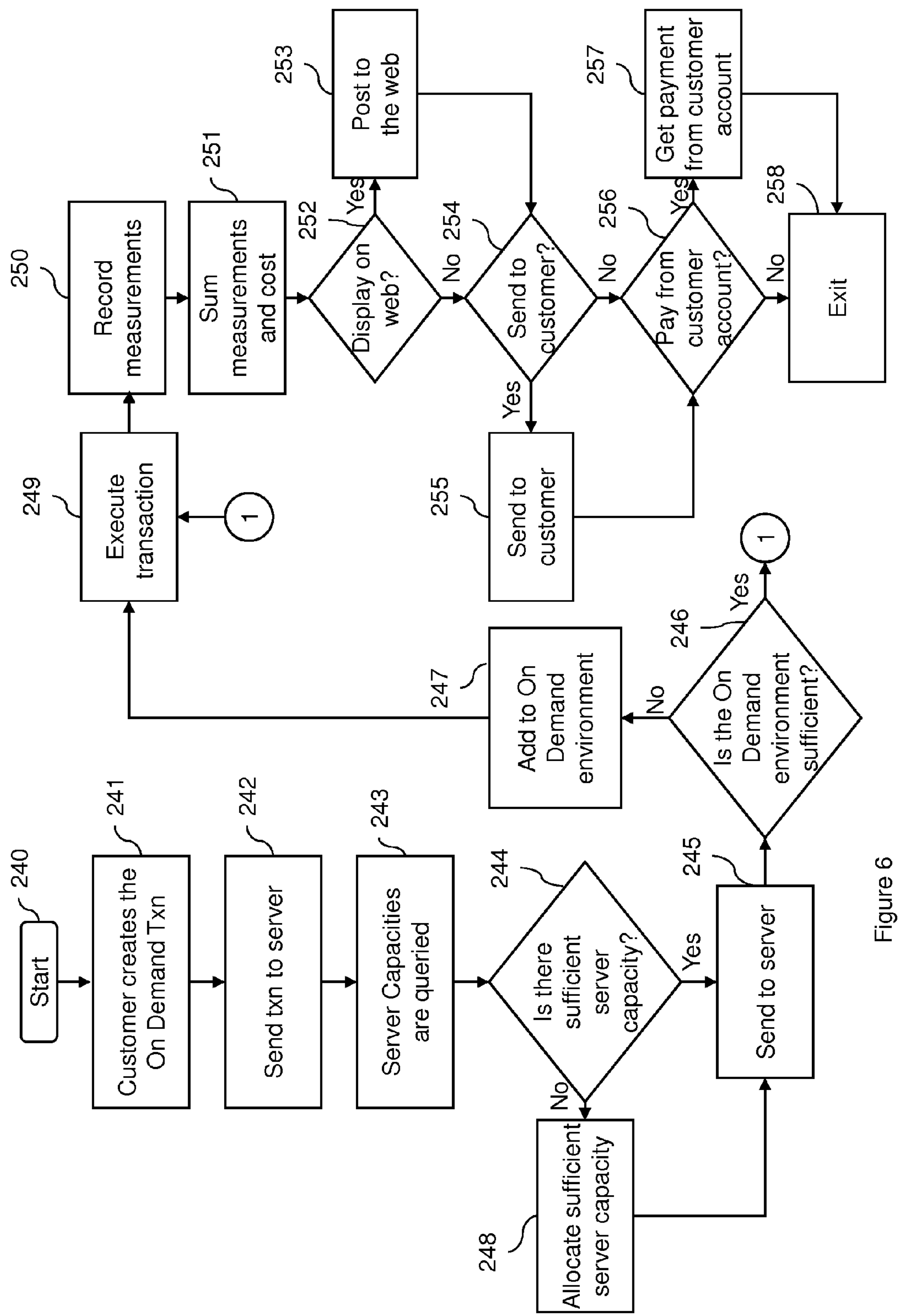
FIG. 6 is a schematic diagram of an on demand system according to embodiments herein.

As shown in FIG. 6, step 240 begins the On Demand process. A transaction is created that contains the unique customer identification, the requested service type and any service parameters that further specify the type of service 241. The transaction is then sent to the main server 242. In an On Demand environment the main server can initially be the only server, then as capacity is consumed, other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions is, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7:
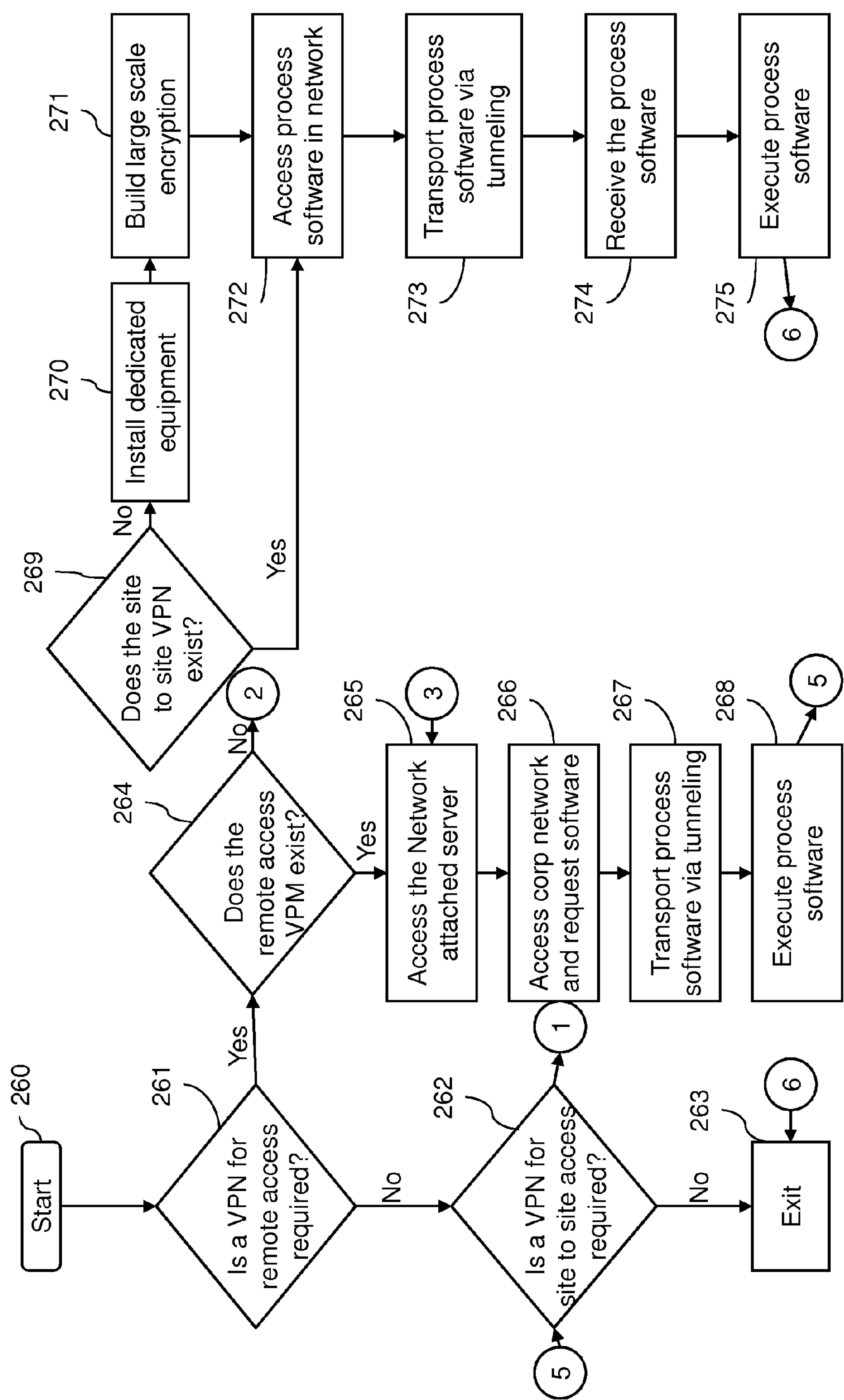
FIG. 7 is a schematic diagram of a virtual private network system according to embodiments herein.
Figure 8:
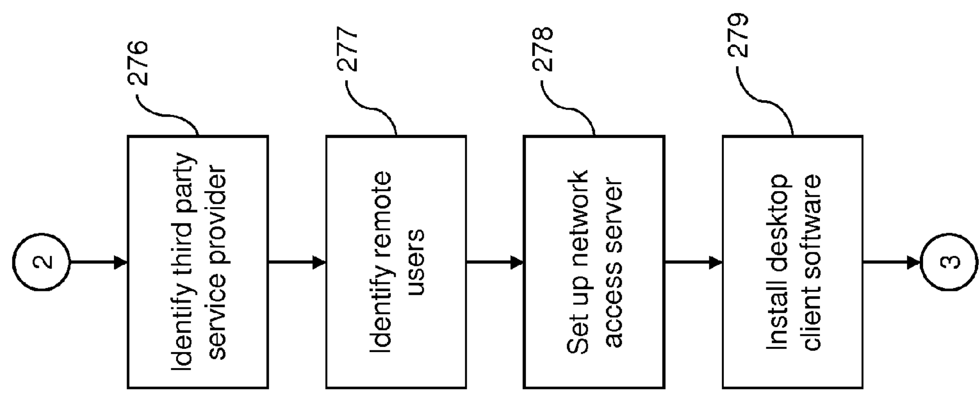
FIG. 8 is a schematic diagram of a virtual private network system according to embodiments herein.

As shown in FIGS. 7 and 8, step 260 begins the Virtual Private Network (VPN) process. A determination is made to see if a VPN for remote access is required 261. If it is not required, then proceed to 262. If it is required, then determine if the remote access VPN exists 264. If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built, or if it has been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is, the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is, the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the embodiments in the form disclosed. Many modifications and variations will be apparent to those of ordinary skill in the art without departing from the scope and spirit herein. The embodiment was chosen and described in order to best explain the principles herein and the practical application, and to enable others of ordinary skill in the art to understand the various embodiments with various modifications as are suited to the particular use contemplated.

What is claimed is:

1. A priority selector comprising:

an input port receiving an input vector comprising bits and a pointer specifying a starting bit location;

a plurality of priority selectors operatively connected in parallel to said input port, each of said priority selectors simultaneously identifying individual group priority bits based on said starting bit location;

a group selector operatively connected to said priority selectors, said group selector choosing a selected priority selector of said priority selectors based on said starting bit location, said group selector outputting said individual group priority bits from said selected priority selector;

a multiplexor operatively connected to said group selector, said multiplexor outputting an output vector having a first value only in said individual group priority bits output by said group selector and all other bits of said output vector having a second value; and a processor operatively connected to said multiplexor, said processor updating a position of said pointer to the next bit following one of said individual group priority bits from said selected priority selector.

2. The priority selector according to claim 1, said input port receiving said input vector at least one additional time for additional processing after said pointer has been updated to said next bit.

3. The priority selector according to claim 1, each of said bits comprising an individual requestor for a limited resource.

4. The priority selector according to claim 1, said group selector choosing said selected priority selector based on said pointer pointing to said individual group priority bit within said selected priority selector.

5. The priority selector according to claim 1, more than one bit in said input vector having said first value.

6. A round robin priority selector comprising:

an input port receiving an input vector comprising bits and a pointer specifying a starting bit location;

a splitter operatively connected to said input port, said splitter grouping said bits into groups of bits;

a plurality of round robin priority selectors operatively connected in parallel to said splitter, each of said round robin priority selectors simultaneously identifying an individual group priority bit within each group of bits based on said starting bit location;

a group selector operatively connected to said round robin priority selectors, said group selector choosing a selected round robin priority selector of said round robin priority selectors based on said starting bit location, said group selector outputting said individual group priority bit from said selected round robin priority selector;

a multiplexor operatively connected to said group selector, said multiplexor outputting an output vector having a first value only in said individual group priority bit output by said group selector, and all other bits of said output vector having a second value; and a processor operatively connected to said multiplexor, said processor updating a position of said pointer to the next bit following said individual group priority bit from said selected round robin priority selector.

7. The round robin priority selector according to claim 6, said input port receiving said input vector at least one additional time for additional processing after said pointer has been updated to said next bit.

8. The round robin priority selector according to claim 6, each of said bits comprising an individual requestor for a limited resource.

9. The round robin priority selector according to claim 6, said group selector choosing said selected round robin priority selector based on said pointer pointing to said individual group priority bit within said selected round robin priority selector.

10. The round robin priority selector according to claim 6, more than one bit in said input vector having said first value.

11. A method of performing round robin priority selection comprising:

receiving, into an input port, an input vector comprising bits and a pointer specifying a starting bit location;

grouping said bits into groups of bits using a splitter;

supplying said groups of bits to a plurality of round robin priority selectors;

simultaneously identifying an individual group priority bit within each group of bits based on said starting bit location using said round robin priority selectors;

choosing, using a group selector, a selected round robin priority selector of said round robin priority selectors based on said starting bit location;

outputting, from said group selector to a multiplexor, said individual group priority bit of said selected round robin priority selector;

outputting, from said multiplexor, an output vector having a first value only in said individual group priority bit output by said group selector, and all other bits of said output vector having a second value; and a processor operatively connected to said multiplexor, said processor updating a position of said pointer to the next bit following said individual group priority bit from said selected round robin priority selector.

12. The method according to claim 11, said input port receiving said input vector at least one additional time for additional processing after said pointer has been updated to said next bit.

13. The method according to claim 11, each of said bits comprising an individual requestor for a limited resource.

14. The method according to claim 11, said group selector choosing said selected round robin priority selector based on said pointer pointing to said individual group priority bit within said selected round robin priority selector.

15. The method according to claim 11, more than one bit in said input vector having said first value.

16. A non-transitory computer readable storage medium readable by a computerized device, said non-transitory computer readable storage medium storing instructions executable by said computerized device to perform a method of performing round robin priority selection comprising:

receiving an input vector comprising bits and a pointer specifying a starting bit location;

grouping said bits into groups of bits;

simultaneously identifying an individual group priority bit within each group of bits based on said starting bit location;

choosing a selected group of bits based on said starting bit location;

outputting an output vector having a first value only in said individual group priority bit of said selected group of bits, and all other bits of said output vector having a second value; and updating a position of said pointer to the next bit following said individual group priority bit.

17. The non-transitory computer readable storage medium according to claim 16, receiving said input vector at least one additional time for additional processing after said pointer has been updated to said next bit.

18. The non-transitory computer readable storage medium according to claim 16, each of said bits comprising an individual requestor for a limited resource.

19. The non-transitory computer readable storage medium according to claim 16, said choosing of said selected group of bits being based on said pointer pointing to said individual group priority bit within said selected group of bits.

20. The non-transitory computer readable storage medium according to claim 16, more than one bit in said input vector having said first value.

* * * * *